US012744778B1

(12) United States Patent
Thakar

(10) Patent No.: US 12,744,778 B1
(45) Date of Patent: Sep. 22, 2026

(54) METHODS AND SYSTEMS FOR DOMAIN NAME REGISTRY LOCK

(71) Applicant: VeriSign, Inc., Reston, VA (US)

(72) Inventor: Sameer Thakar, Leesburg, VA (US)

(73) Assignee: VeriSign, Inc., Reston, VA (US)

( * ) Notice: Subject to any disclaimer, the term of this patent is extended or adjusted under 35 U.S.C. 154(b) by 326 days.

(21) Appl. No.: 18/121,519

(22) Filed: Mar. 14, 2023

Related U.S. Application Data

(60) Provisional application No. 63/319,656, filed on Mar. 14, 2022.

(51) Int. Cl.
*H04L 29/00* (2006.01)
*H04L 9/40* (2022.01)

(52) U.S. Cl.
CPC ............ *H04L 63/10* (2013.01); *H04L 63/062* (2013.01); *H04L 63/068* (2013.01)

(58) Field of Classification Search
CPC ...... H04L 63/10; H04L 63/062; H04L 63/068
See application file for complete search history.

(56) References Cited

U.S. PATENT DOCUMENTS 10,182,032 B2* 1/2019 Gould ................. H04L 61/4511
11,329,951 B2 5/2022 Gould et al.
11,616,756 B1 3/2023 Gould et al.
2005/0266798 A1* 12/2005 Moloney ............... H04W 12/02 455/410
2008/0059607 A1* 3/2008 Schneider ........... G06F 16/2425 709/218
2009/0037728 A1* 2/2009 Kamikura ............. H04L 9/3263 380/282
2010/0106616 A1* 4/2010 Adelman ............... G06Q 30/08 705/26.1
2012/0173681 A1* 7/2012 Gould ................. H04L 61/4511 709/221
2013/0055356 A1* 2/2013 Gafni ...................... G06F 21/40 726/4
2014/0223520 A1* 8/2014 Gafni ...................... G06F 21/40 726/4
2016/0065533 A1* 3/2016 Schilling ............... H04L 61/457 709/221
2016/0182562 A1* 6/2016 Gupta ................. H04L 63/0846 726/6
2017/0104591 A1* 4/2017 Merdinger .............. G06F 21/30
2017/0104592 A1* 4/2017 Merdinger ............ H04L 9/0819
2017/0310707 A1* 10/2017 Amelchenko ......... H04L 63/102
2018/0351910 A1* 12/2018 Zhou .................... G06Q 30/018
2018/0376329 A1* 12/2018 Gapastione ....... H04W 12/0431
2019/0379636 A1* 12/2019 Phoenix ................ H04L 61/302
2020/0403789 A1* 12/2020 Murdoch ............. H04L 9/0869
2022/0141226 A1* 5/2022 Obispo Semidey .. G06F 40/279 726/3
2022/0182246 A1* 6/2022 Murphy ................ H04L 9/3271

* cited by examiner

*Primary Examiner* — Don G Zhao
(74) *Attorney, Agent, or Firm* — McCarter & English, LLP; Michael A. Sartori

(57) ABSTRACT

According to some embodiments, a method is performed by a domain name registry. The method comprises receiving, via a first communication channel, a request from a registrar for a temporary key associated with a domain name and transmitting a temporary key to the registrar. The temporary key is associated with the domain name. The method further comprises receiving, via a second communications channel, the temporary key and transmitting, via the second communications channel, a permanent key for retrieval by a registrant of the domain name.

15 Claims, 3 Drawing Sheets

METHODS AND SYSTEMS FOR DOMAIN NAME REGISTRY LOCK

CROSS-REFERENCE

This application claims priority to U.S. Patent Application No. 63/319,656, filed Mar. 14, 2022, which is hereby incorporated by reference in its entirety.

BACKGROUND

The Domain Name System (DNS) is the part of the Internet infrastructure that translates human-readable domain names into the Internet Protocol (IP) numbers needed to establish TCP/IP communication over the Internet. DNS allows users to refer to web sites, and other resources, using easier to remember domain names, such as "www.example.com", rather than the numeric IP addresses associated with a website, e.g., 123.4.56.78, and assigned to computers on the Internet. Each domain name can be made up of a series of character strings (labels) separated by dots. The right-most label in a domain name is known as the "top-level domain" (TLD). Examples of well-known TLDs are "com", "net", "org" etc. Each TLD supports second-level domains, listed immediately to the left of the TLD, e.g. the "example" level in "www.example.com". Each second-level domain can include a number of third-level domains located immediately to the left of the second-level domain, e.g. the "www" level in www.example.com.

The responsibility for operating each TLD (including maintaining a registry of the second-level domains within the TLD) or second-level domains (or other levels) or zones within the TLD, for example, is delegated to a particular organization, such as a domain name registry. During the domain name resolution process, the registry is primarily responsible, at least in part, for answering queries for IP addresses associated with domains, typically through DNS servers that maintain such information in large databases and operating its top-level domain.

For example, the Internet Corporation for Assigned Names and Numbers (ICANN) has authority over the generic TLDs for the global Domain Name System like dotcom and dotnet. To obtain a domain name, the domain name has to be registered. Registration of domain names can be done, for example, through a domain name registrar. For example, a registrar is an entity that is accredited by ICANN or by a national ccTLD (country code TLD) authority, to register Internet domain names. Alternatively, an end-user can register a domain name indirectly through one or more layers of resellers.

A registrar may have a dedicated service connection with the registries to access domain related services, e.g., domain name creation, renewal, and other registry services. For example, registrars typically use the Extensible Provisioning Protocol (EPP) as a vehicle to communicate with the registries to register or renew domain names or access other registry services. The EPP is a protocol designed for allocating objects within registries over the internet. For example, the EPP protocol may be based on XML-a structured, text-based format. The underlying network transport is not fixed, although the currently specified method is over Transmission Control Protocol (TCP).

A domain lock service provided by a registry may be used to protect domain names against unauthorized and unintended deletion, renewal, transfer and/or update to a domain name registration or record. The registry may implement status codes to lock a domain name, such as EPP status codes (or server codes) to set a domain status to serverUpdateProhibited (e.g., to prevent an update), serverTransferProhibited (e.g., to prevent a transfer), serverDeleteProhibited (e.g., to prevent deletion), and/or other status code that prohibit one or more actions to the domain name registration or domain name record. For example, a registry lock service may prevent domain name hijacking. Domain name hijacking may occur when an attacker gains unauthorized access to registration data for a domain name, thereby gaining administrative control over the domain name that enables the attacker to modify one or more elements of the domain name, including the IP address to which the domain name resolves.

SUMMARY

According to an example embodiment, a computer-implemented method is performed by a domain name registry. The computer comprises one or more processors and memory accessible by the one or more processors. The memory stores instructions that when executed by the one or more processors cause the computer to perform the method. The method comprises receiving, via a first communication channel, a request from a registrar for a temporary key associated with a domain name and transmitting a temporary key to the registrar. The temporary key is associated with the domain name. The method further comprises receiving, via a second communications channel, the temporary key and transmitting, via the second communications channel, a permanent key for retrieval by a registrant of the domain name.

According to an example embodiment, an apparatus to register domain names comprises at least one processor and memory accessible by the at least one processor. The memory stores instructions executable by the at least one processor. The executed instructions cause the computer system to: receive a request to register a domain name; register the domain name; generate a temporary key for the domain name; provide, via an in-band channel, the temporary key; receive, via an out-of-band channel, the temporary key; generate a permanent key based on the temporary key; and provide, via the out-of-band channel, the permanent key.

According to an example embodiment, an apparatus to register domain names comprises at least one processor and memory accessible by the at least one processor. The memory stores instructions executable by the at least one processor. The executed instructions implement a shared registry system configured to store information associated with a plurality of domain name registrations and a registry lock/unlock engine configured to interact with the shared registry system, to: provide a temporary key for a registered domain name, wherein the temporary key is configured for provisioning a permanent key for the registered domain name, and authorize a registry lock operation based on validation of the permanent key. The executed instructions further implement a registry lock/unlock user interface configured to interact with the registry lock/unlock engine, wherein the registry lock/unlock user interface is configured to provide the permanent key for the registered domain name based on the temporary key received by the registry lock/unlock user interface.

According to an example embodiment, a non-transitory computer-readable medium comprises instructions. The instructions, when executed by a computer, cause the computer to perform a method comprising: receiving a request from a registrar for a temporary key associated with a domain name; generating a temporary key for the domain name; transmitting the temporary key to the registrar; receiving a request from a registrant for a permanent key based on the temporary key; generating a permanent key based on the temporary key; and transmitting the permanent key to the registrant, wherein the transmitting the permanent key to the registrant comprises securing the permanent key from the registrar.

BRIEF DESCRIPTION OF THE DRAWINGS

Various embodiments are described in detail below with reference to the accompanying drawings, in which like reference numerals represent like elements.

DETAILED DESCRIPTION

Figure 1:
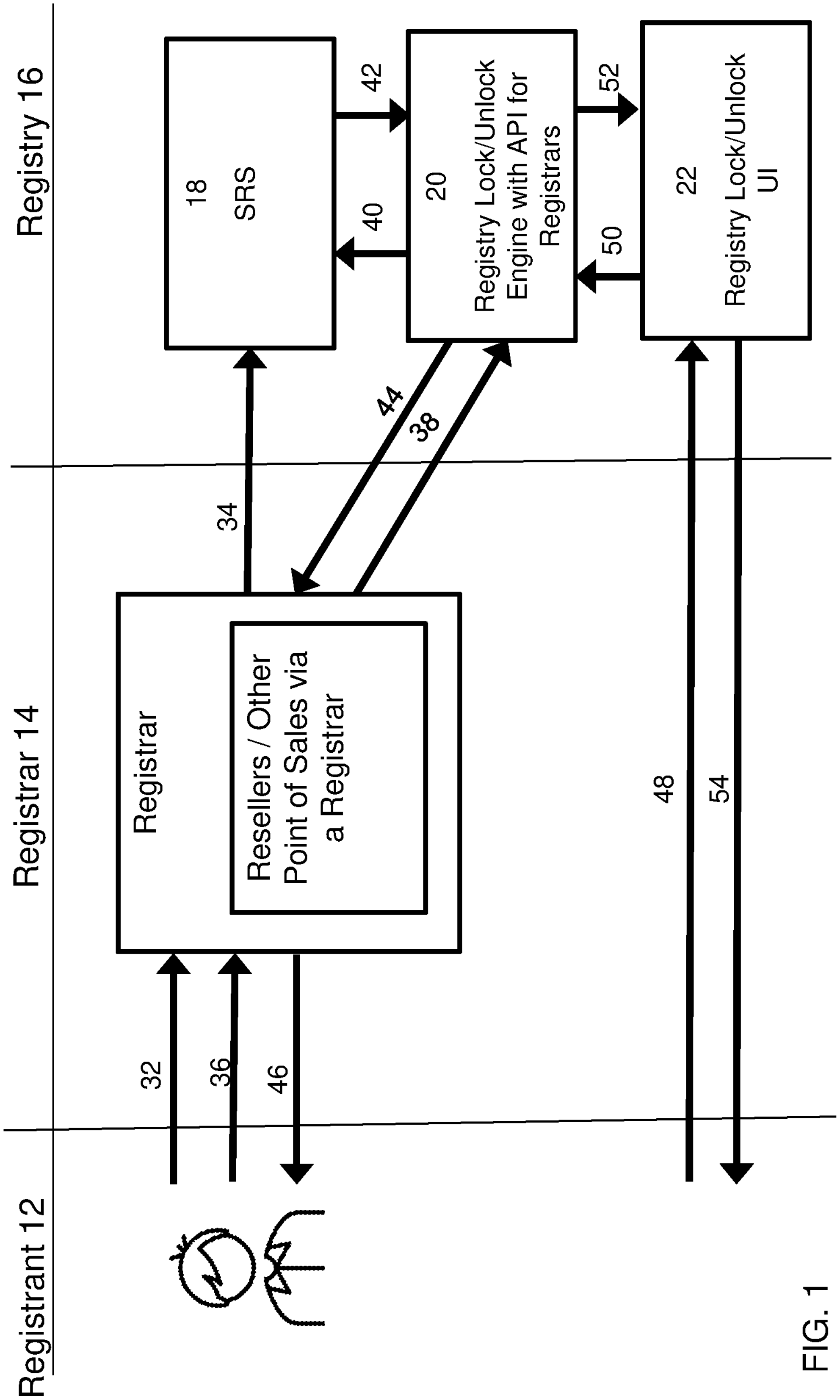
FIG. 1 is a flow diagram illustrating components of a multiple party validated domain name system registry lock, according to some embodiments.

As recognized by the inventor, certain challenges currently exist with DNS registry lock services. For example, current registry lock solutions for a registry are typically provided to registrants via a registrar channel, and any registrant interactions with registries are handled via the registrars. This situation presents a problem that if the registrar (or registrar personnel) is compromised, the security of the domain name may also be compromised.

This situation may arise for all types of registries, including thin registries and thick registries. For example, a thin registry may maintain certain technical data sufficient to identify the sponsoring registrar (or registrar of record for the domain name), status of the registration, and creation and expiration dates for each registration in its data store. According to an embodiment, the thin registry does not maintain information identifying a registrant of the domain name and/or contact information for the registrant of the domain name. A thick registry may maintain, for example, contact information of the registrant and its designated administrative and technical contact information, in addition to the sponsoring registrar and registration status information maintained by a thin registry.

Some embodiments may provide one or more technical advantages. As discovered by the inventor, certain aspects of the present disclosure and their embodiments may provide solutions to these or other challenges. For example, particular embodiments may include an improved registry lock/unlock process where a registrant is able to submit information for authorization (e.g., a first secret key known only to the registrant and not the registrar, a request via a secure first communications channel, or other authorization information) of the registry lock/unlock operation that is separate and/or secure from a registrar that is also able to submit information for authorization (e.g., a second secret key known only to the registrar, a request via a secure second communications channel, or other authorization information) of the registry lock/unlock operation. For example, the first key or other registrant authorization information may be known only to the registrant and the registry, and the second key or other registrar authorization information may be known only to the registrar and/or the registry. For any domain lock/unlock operation, both keys or both registrant/registrar authorization information are required. According to an embodiment, a benefit is that even if one party (e.g., the registrar) is compromised, the domain name may still be secure because the other key is safe with the registrant. Furthermore, the registry need not know the identity of the registrant because the ability to perform the registry lock/unlock operation depends on the correct key(s) rather than the identity of the registrant.

Some embodiments may benefit from some, none, or all of these technical advantages. Other technical advantages may be readily ascertained by one of ordinary skill in the art.

In an example embodiment, upon registration of a domain name or during a first domain lock/unlock operation, such as at the request of the registrant, the registrar for the domain name may request a key, such as a temporary key, from the registry for the domain name. The registrar request for the temporary key may be made, for example, via an application programming interface (API), the Extensible Provisioning Protocol (EPP), or another in-band communications channel established between the registrar and the registry. According to an embodiment, the registry may create the temporary key with a validity period set for a predetermined number of uses (e.g., one-time use) and/or a predetermined amount of time of validity or time-to-live (TTL). The predetermined amount of time may be set according to an indication of a desired TTL included with the registrar request for the temporary key, according to a predetermined amount of time set by a policy of the registry, and/or according to a predetermined amount of time set by a policy of the registrar.

According to an embodiment, the temporary key is unique to the domain name. According to another embodiment, the temporary key is unique to the registrant of the domain name.

In response to the request by the registrar, the registry sends the temporary key to the registrar, such as, for example, via the application programming interface (API), the EPP, or another in-band communications channel established between the registrar and the registry. In turn, the registrar may send or provide the temporary key to the registrant for the domain name, such as via a registrar user interface accessible by the registrant, electronic mail, secure file transfer, or other access point for the registrant to retrieve the temporary key. In this scenario, the registrar is responsible for authenticating the registrant as the correct registrant to provide the temporary key. According to an embodiment, the registry sends the temporary key directly to the registrant or provides the temporary key for retrieval by the registrant. For example, the temporary key may be sent from the registry to the registrant via the different, or out-of-band, communications channel described below.

The registrant, within the validity period, may send the temporary key to the registry to request a permanent domain lock/unlock key. According to an embodiment, the temporary key is sent from the registrant to the registry via a different, or out-of-band, communications channel from the EPP or other in-band communications protocol established between the registrar and the registry.

For example, the out-of-band communications channel may be via a registry user interface accessible by the registrant, electronic mail, secure file transfer, or other access point for the registrant to send the temporary key directly to the registry. The out-of-band communications channel between the registrant and the registry may be secure from the registrar, although it may be provided via the registrar website via a portal secured from the registrar. According to an embodiment, the out-of-band communications channel may communicate the temporary key (and the permanent domain lock/unlock key, described below) and may not communicate identifying information of the registrant to the registry.

In response to receiving the temporary key within the predetermined validity period, the registry creates a permanent domain lock/unlock key for use by the registrant to request a registry lock/unlock operation. The registrant may receive the permanent domain lock/unlock key from the registry and may store the permanent domain lock/unlock key for use with later domain lock/unlock operations for the domain name.

According to an embodiment, the permanent domain lock/unlock key is unique to the domain name. According to another embodiment, the permanent domain lock/unlock key is unique to a combination of the domain name and a registrar, such as the registrar of record for the domain name. According to another embodiment, such as for a thick registry, the permanent domain lock/unlock key is unique to the registrant of the domain name and may be used for domain lock/unlock operations for other domain names registered by the registrant.

When the registrant wants to lock or unlock the domain name at the registry, the registrant may send two requests to lock/unlock the domain name:

1) a first request to lock/unlock the domain name to the registrar via the in-band communications channel between the registrant and the registrar, and
2) a second request to lock/unlock the domain name, including the permanent domain lock/unlock key, to the registry via the out-of-band communications channel between the registrant and the registry.

According to an embodiment, the first and second requests to lock/unlock the domain name may be sent in parallel with each other, simultaneously with each other, or one may be sent subsequent to the other.

After receiving the first request to lock/unlock the domain name by the registrar, the registrar may create a third request to lock/unlock the domain name. For example, the third request created by the registrar may be a domain lock EPP command based on the first request or a request via an API. According to an embodiment, a registrar key, or other authorization or verification between the registry and the registrar, may accompany the third request sent from the registrar to the registry. According to an embodiment, the registrar sends the third request to lock/unlock the domain name to the registry via the in-band communications channel.

After receiving both the second request from the registrant and the third request from the registrar, the registry determines the validity of the request to lock/unlock the domain name. For example, the registry determines whether the permanent domain lock/unlock key received from the registrant is valid. As another example, the registry determines whether the permanent domain lock/unlock key received from the registrant and the registrar key, or other authorization or verification between the registry and the registrar, are both valid. As another example, the registry determines whether the permanent domain lock/unlock key received from the registrant is valid and that the registrar is the registrar of record for the domain name, is an authorized registrar contact, or is otherwise on a safelist for requesting a lock/unlock operation for the domain name. After the registry determines the validity of the request to lock/unlock the domain name, the registry performs the requested lock/unlock operation. According to an embodiment, the registry may notify the registrar that the request to lock/unlock the domain name is completed, such as via an Extensible Provisioning Protocol (EPP) or other communications protocol change poll message and/or a pending action poll message.

If the registry determines that the request to lock/unlock the domain name is not valid, the registry does not perform the requested lock/unlock operation. Additionally, if only one of the second request from the registrant or the third request from the registrar is received by the registry, the registry does not perform the requested lock/unlock operation. According to an embodiment, the registry may notify the registrar, such as via the in-band channel, that the request to lock/unlock the domain name was not validated and/or completed, such as via an EPP or other communications protocol pending action poll message.

The registry may additionally or alternatively provide a notification to the registrant, such as via the out-of-band channel, that the request to lock/unlock the domain name was not validated and/or completed. According to an embodiment, if only the third request from the registrar is received by the registry after a predetermined amount of time, the registry may provide the notification, for retrieval by the registrant, that the registrar requested a domain lock/unlock operation that could not be validated and/or completed.

If the registry is a thick registry, the registry may additionally or alternatively notify the registrant, such as via the out-of-band channel or via registrant contact information known by the registry, that the request to lock/unlock the domain name was not validated and/or completed. According to an embodiment, if only the third request from the registrar is received by the registry after a predetermined amount of time, the registry may notify the registrant that the registrar requested a domain lock/unlock operation that could not be validated and/or completed.

Particular embodiments are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

FIG. 1 is a flow diagram illustrating components of a multiple party validated domain name system registry lock, according to some embodiments. In general, the multiple parties involved with validated DNS registry lock include registrant 12, registrar 14, and registry 16. As described above, registrant 12 may be a person, end user, company, or organization that registers one or more domain names (e.g., "vegancupcakes.com") from registry 16 via registrar or reseller 14. Registrar or reseller 14 communicates with registry 16 to create new domain name registrations, renew domain name registrations, delete domain name registrations, modify domain name registration records, and/or access other registry services. According to an embodiment, registrar 14 may be configured to communicate with registrant 12 via a user interface accessible by registrant 12. For example, the user interface may be a registrar website or other electronic communication points configured to be accessible by registrant 12.

According to an embodiment, registry 16 may include SRS 18, a registry lock/unlock engine 20, and a registry lock/unlock user interface (UI) 22. SRS 18 may include a database of domain names and may facilitate creation, modification, and deletion of domain name registration records. SRS 18 may support communication with one or more registrars 14 via a first in-band communications channel between registrar 14 and registry 16. According to an embodiment, SRS 18 may support the Extensible Provisioning Protocol (EPP) or other communications protocol for secure communication with registry 16 to allocate objects within registry 16, for example.

According to an embodiment, registry lock/unlock engine 20 may provide an interface, such as an application programming interface (API) or second in-band communications channel established between the registrar and the registry, for registrars 14 to request domain lock/unlock operation(s) and request temporary key(s) on behalf of a registrant 12. According to an embodiment, registry lock/unlock engine 20 may be integrated with SRS 18, and registrars 14 may be configured to request domain lock/unlock operation(s) and request temporary key(s) on behalf of a registrant 12 via the EPP or first in-band communications channel established between the registrar and the registry.

According to an embodiment, the registry may implement status codes to lock a domain name, such as EPP status codes (or server codes) to set a domain status to serverUpdateProhibited (e.g., to prevent an update), serverTransferProhibited (e.g., to prevent a transfer), serverDeleteProhibited (e.g., to prevent deletion), and/or other status code that prohibit one or more actions to the domain name registration or domain name record. The domain lock operation may include, for example, adding one or more of the EPP status codes to a domain name record. In contrast, the domain name unlock operation may include, for example, removing one or more of the EPP status codes from a domain name record.

According to an embodiment, registry lock/unlock user interface (UI) 22 may provide an interface for registrants 12 to request permanent domain lock/unlock key(s) from registry 16. For example, the registry lock/unlock user interface (UI) may provide a communication channel, such as an out-of-band communication channel, different and secure from the communication channel(s) between registrar 14 and registry 16. Registry lock/unlock user interface (UI) 22 may be provided by registry 16 at, for example, a website of registry 16 or a website of registrar 14 such that information passed between registrant 12 and registry 16 is secured from access by registrar 14. This communication channel may be configured for communicating the temporary and permanent domain lock/unlock keys without any identifying information of the registrant.

With reference to FIG. 1, the following steps illustrate an example key provisioning operation for a multiple party validated DNS registry lock according to certain example embodiments.

At step 32, registrant 12 requests registration a domain name through registrar 14. For example, registrant 12 may request registration of the domain name "vegancupcakes.com" from registrar 14. Step 32 may include, for example, an automated registration via electronic interface(s) (e.g., web form or other software interface) or a physical interaction (telephone, electronic mail, in-person, etc.).

At step 34, registrar 14 sends a request to registry 16 to register the domain name "vegancupcakes.com" via a first in-band communication channel. For example, registrar 14 may send an EPP Create command to SRS 18 of registry 16 via an established connection between registrar 14 and registry 16. Registry 16 is configured to provision the domain name registration, as known to one of ordinary skill in the art.

Provisioning of a permanent domain lock/unlock key for the domain may occur concurrent with the domain name registration process or at any time prior to a first domain lock/unlock operation by registry 16. According to an embodiment, provisioning the permanent domain lock/unlock key is a one-time key generation process. According to an embodiment, the domain lock operation may be performed by registry 16 automatically upon, for example, a new registration of a domain name, a renewal of a domain name, and/or based on a registry policy (e.g., when domain lock is identified as a security mechanism required for a particular domain), so that the permanent domain lock/unlock key must be provisioned with a first request by the registrant for a registry unlock operation for the domain name.

The one-time key generation process may begin with step 32 during the request to register a domain name. Alternatively, the one-time key generation process may begin at step 36 with a request from registrant 12 to registrar 14 for registry lock or unlock of a domain name. For example, registrant 12 may request registrar 14 to request registry lock of the domain name "vegancupcakes.com." According to an embodiment, registrar 14 may authenticate or validate registrant 12 at this step according to any suitable authentication or validation procedures implemented by registrar 14 such as, for example, a username/password combination, or other procedures.

At step 38, registrar 14 requests a temporary key from the registry for the domain name via a communications channel between registrar 14 and registry 16. The request for the temporary key may include, for example, an indication of the domain name, an indication that registry lock or unlock operations are requested, and/or a desired TTL for the temporary key.

For example, registrar 14 may request a temporary key for "vegancupcakes.com" from registry 16 via a second in-band channel, such as an API request, to registry lock/unlock engine 20. As another example, registrar 14 may request a temporary key for "vegancupcakes.com" from registry 16 via an EPP request to SRS 18 that includes registry lock/unlock engine 20. This communication channel may be the first in-band channel or a second in-band channel.

Before granting the temporary key, registry 16 is configured to verify the domain name in the request. For example, at step 40 registry lock/unlock engine 20 may send a verification request to SRS 18. At step 42, SRS 18 may respond with a verification response indicating, for example, that the domain name is a registered domain name, the domain name is not subject to hold requirement, court order, or other actions that prohibit modification of the domain name records, and/or that registry lock/unlock services are available for the domain name. If the verification is successful, the procedure continues to step 44.

After verifying the domain name, registry 16 may create a temporary key for registrant 12 to use to request a permanent domain lock/unlock key. As described above, the temporary key may be created as a one-time use key and/or with a predetermined TTL based on the registrar request, a policy of registrar 14, and/or a policy of registry 16. At step 44, the registry returns the temporary key to the registrar 14 via the communication channel established between registrar 14 and registry 16 (e.g., the first in-band communication channel or the second in-band communication channel). For example, registry 16 may return a temporary key (e.g., "1234") to registrar 14 via a response from registry lock/unlock engine 20. The temporary key may be valid for one time use by registrant 12 and/or a predetermined amount of time or TTL (e.g., 15 minutes).

At step 46, registrar 14 returns the temporary key to registrant 12. For example, registrar 14 may return the temporary key "1234" for "vegancupcakes.com" to registrant 12 via the registrar website or other electronic communication points configured to be accessible by registrant 12.

Registrant 12 may then use the temporary key to request a permanent domain lock/unlock key from registry 16. At step 48, registrant 12 may send the temporary key to registry 16. For example, registrant 12 may send the temporary key "1234" to registry lock/unlock UI 22 of registry 16 via an out-of-band communication channel that is separate and secure from the first in-band communication channel and/or second in-band communication channel. For example, the out-of-band communication channel is secure from access by registrar 14. According to an embodiment, registry lock/unlock UI 22 of registry 16 is configured to receive the temporary key without receiving any identifying information of registrant 12. Instead, registry 16 determines the permanent domain lock/unlock key based on the temporary key, which was previously created for a particular domain.

After receiving the temporary key, registry 16 validates the temporary key. For example, at step 50, registry lock/unlock UI 22 may send temporary key "1234" to registry lock/unlock engine 20 for validation. For example, registry lock/unlock UI 22 may send temporary key "1234" to registry lock/unlock engine 20. According to an embodiment, registry lock/unlock engine 20 is configured to validate the temporary key by determining that the temporary key is valid (e.g., that it is the same as the temporary key previously created by registry 16 for the domain name, it is within the one-time-use parameter, and/or it was received by registry 16 within the TTL for the temporary key). After determining that the temporary key is valid, registry lock/unlock engine 20 retrieves or creates a permanent domain lock/unlock key domain (e.g., "abcdef12345dfederejkd1f3zf4hg56578hjuyder7") for the domain. At step 52, registry lock/unlock engine 20 may return the permanent domain lock/unlock key to registry lock/unlock UI 22.

At step 54, registry 16 returns the permanent domain lock/unlock key to the registrant 12. For example, the permanent domain lock/unlock key "abcdef12345dfederejkd1f3zf4hg56578hjuyder7" is returned via the registry lock/unlock UI 22 for retrieval by registrant 12.

The temporary key and the permanent domain lock/unlock key may comprise any suitable authentication keys, such as from a key generator using a random number generator (RNG), pseudorandom number generator (PRNG), a cryptographic function (e.g., using information from the request, information from the domain name, the registrant, and/or the domain name), a hash function (e.g., using information from the request, information from the domain name, the registrant, and/or the domain name), or other function or algorithm as known to one of ordinary skill in the art.

Registrant 12 may use the permanent domain lock/unlock key for future registry lock/unlock operations for the domain. According to an embodiment, using the permanent domain lock/unlock key, registry 16 need not know the identity of registrant 12 for the domain to assess the validity of requests for a registry lock/unlock operation.

Figure 2:
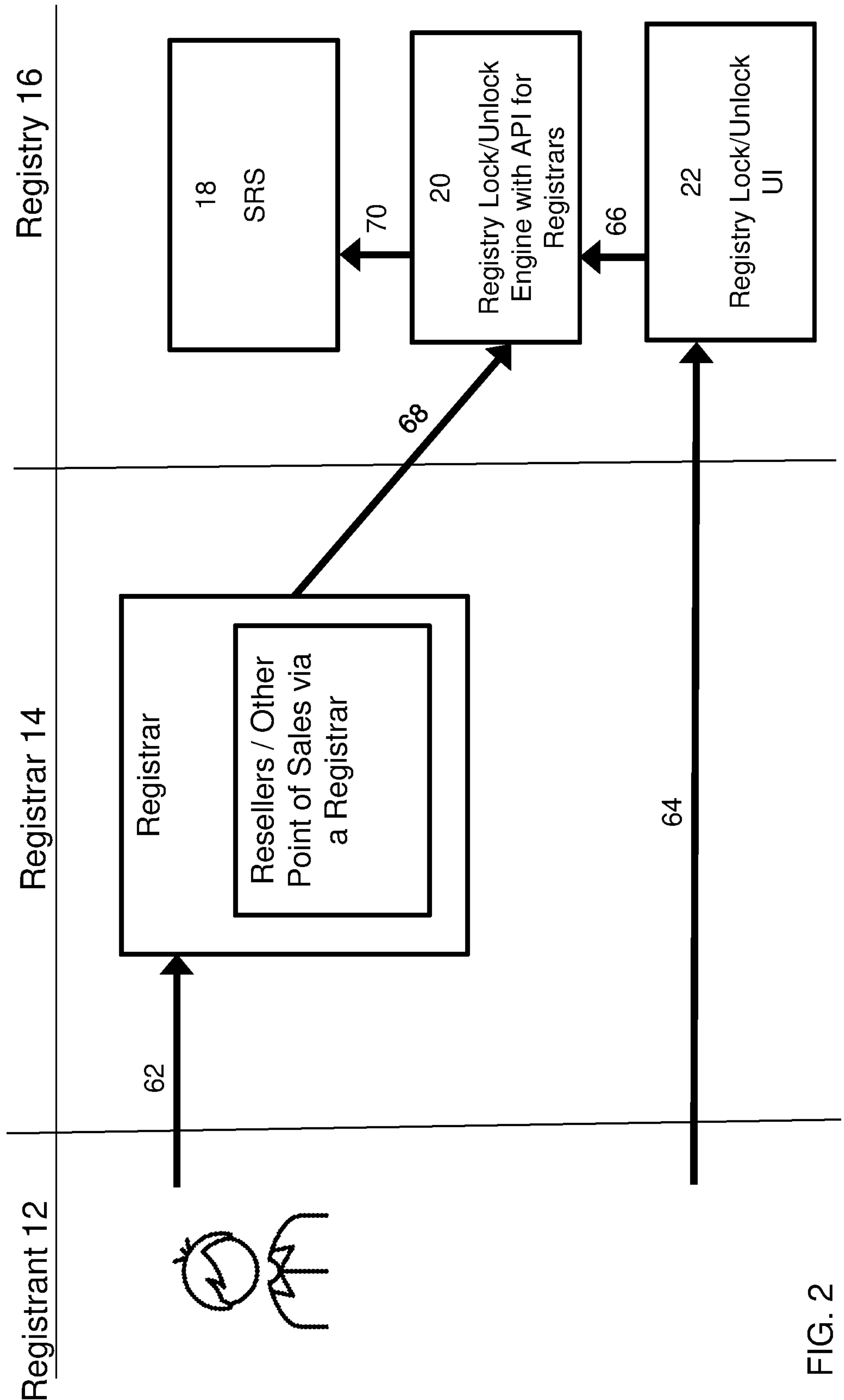
FIG. 2 is a flow diagram illustrating components of a multiple party validated domain name system registry lock, according to some embodiments.

FIG. 2 is another flow diagram illustrating components of a registry lock/unlock operation for a multiple party validated domain name system registry lock, according to some embodiments. The procedure begins at steps 62 and 64. At step 62, registrant 12 sends a lock or unlock request for the domain name to registrar 14. For example, registrant 12 may send a lock or unlock request for "vegancupcakes.com" to registrar 14. Around the same time, at step 64, registrant 12 also sends a lock or unlock request for the domain name to registry 16 via the out-of-band communication channel between registrant 12 and registry 16. For example, registrant 12 may send a lock/unlock request for "vegancupcakes.com" using the permanent domain lock/unlock key "abcdef12345dfederejkd1f3zf4hg56578hjuyder7" for the domain name via registry lock/unlock UI 22 of registry 16. According to an embodiment, registrant 12 sends the permanent domain lock/unlock key and an indication of the domain name. According to an embodiment, registrant 12 sends only the permanent domain lock/unlock key, and registry 16 is configured to determine the domain name associated with the permanent domain lock/unlock key, such as based on a lookup table, an algorithm, or other lookup.

At step 68, registrar 14 sends a request to lock or unlock the domain name to registry 16 via a communication channel between registrar 14 and registry 16, such as the in-band communication channel. According to an embodiment, the in-band communication channel may be the first in-band communication channel or the second in-band communication channel. According to an embodiment, the lock/unlock request sent by registrar 14 to registry 16 may be manual (e.g., via telephone) or automatic (e.g., via web form) between registry 16 and registrar 14 and may have multiple factors of authentication.

For example, registrar 14 may send a lock/unlock request for "vegancupcakes.com" to registry lock/unlock engine 20 of registry 16. For example, the lock/unlock request sent by registrar 14 to registry 16 may include at least one or more of the following information: (a) indication of the domain name, (b) identity of registrar 14, and/or (c) information sufficient to authenticate registrar 14 for the domain name, such as a token or key previously provided to registrar 14 by registry 16, a username/password combination, or other authentication factors. According to an embodiment, the lock/unlock request sent by registrar 14 to registry 16 may not include a key previously provided by the registry 16, such as the permanent domain lock/unlock key for the domain name.

Upon receipt of the permanent domain lock/unlock key for the domain name or the lock/unlock request for the domain name sent by registrar 14, registry 16 is configured to check for receipt of the other of the permanent domain lock/unlock key for the domain name or the lock/unlock request for the domain name sent by registrar 14 prior to proceeding with validation of the request to lock/unlock the domain name. According to an embodiment, the permanent domain lock/unlock key for the domain name and the lock/unlock request for the domain name sent by registrar 14 must be received by registry 16 (such as by registry lock/unlock engine 20 and/or registry lock/unlock UI 22) within a predetermined amount of time from each other.

For example, if the requests in step 68 and step 64 are not received within the certain amount of time, the requests are not validated. According to an embodiment, the registry lock/unlock engine 20 must receive the request in step 68 and the request in step 66 with the permanent domain lock/unlock key within a certain amount of time of each other (e.g., within 1 minute, 5 minutes, 10 minutes, or 30 minutes). For example, if the requests in step 68 and step 66 are not received within the certain amount of time, the requests are not validated. According to an embodiment, the predetermined amount of time may be based on a registry policy that requires the permanent domain lock/unlock key for the domain name and the lock/unlock request for the domain name sent by registrar 14 to be received by registry 16 within 1 minute of each other, 5 minutes of each other, 1 hour of each other, 1 day of each other, or other predetermined amount of time.

After receiving both the lock/unlock request for the domain name from registrant 12 and registrar 14, such as within the predetermined amount of time from each other, registry 16 may proceed to validate the lock/unlock request for the domain name. At step 66, registry lock/unlock UI 22 may send permanent key "abcdef12345dfederejkd1f3zf4hg56578hjuyder7" associated with "vegancupcakes.com" to registry lock/unlock engine 20 for validation. According to an embodiment, registry lock/unlock engine 20 validates the lock/unlock request for the domain name by: i) validating the permanent domain lock/unlock key or ii) validating both the permanent domain lock/unlock key and the lock/unlock request sent by registrar 14.

Validating the permanent domain lock/unlock key may be performed in a variety of different ways. For example, registry lock/unlock engine 20 may determine that the permanent domain lock/unlock key for the domain name received at registry lock/unlock UI 22 is the expected permanent domain lock/unlock key for the domain name (e.g., it is the same as the previously created permanent domain lock/unlock key for the domain name). As another example, registry lock/unlock engine 20 may use an algorithm to determine the permanent domain lock/unlock key received at the registry lock/unlock UI 22 is the correct key for the domain name.

Validating the lock/unlock request sent by registrar 14 may be performed in a variety of different ways. For example, based on the lock/unlock request sent by registrar 14, registry lock/unlock engine 20 may determine that registrar 14 is on a safelist of requesting registry lock/unlock operations for the domain name. As another example, the registry lock/unlock engine 20 may determine that the request sent by registrar 14 contains information sufficient to authenticate registrar 14, sufficient to authenticate registrar 14 as authorized to request registry lock/unlock operations for the domain name, and/or contains information sufficient to identify registrar 14 as the registrar of record for the domain name.

After registry 16 validates the lock/unlock request for the domain name, the method continues to step 70 where registry 16 performs the operation to lock or unlock the domain name. For example, registry lock/unlock engine 20 may send a lock/unlock request to SRS 18. In response, SRS 18 may modify the record(s) of the domain name registration, such as the status of the Delete, Renew, Transfer and Update fields of the domain name record. For example, for a validated request to lock the domain name, SRS 18 may modify the status fields to indicate updates are prohibited (e.g., serverUpdateProhibited). For a validated request to unlock the domain name, SRS 18 may modify the status fields to remove an indication that updates are prohibited.

If the request(s) are not validated, registry 16 will not perform the lock/unlock operation for the domain and may send an alert or notification to one or both of registrar 14 and/or registrant 12 that a lock/unlock request was submitted but not validated. For example, registry 16 may notify registrar 14, such as via the first or second in-band channel, that the request to lock/unlock the domain name was not validated and/or completed. For example, registry 16 may notify registrant 12, such as via the out-of-band channel or via registrant contact information known by the registry, that the request to lock/unlock the domain name was not validated and/or completed. If the notification is provided via registry lock/unlock UI 22, registrant 12 may be able to retrieve the notification using the permanent domain lock/unlock key.

An advantage of particular embodiments is that even if the registrar is compromised (e.g., social engineering, insider threat, etc.), the lock/unlock status is still safe because the registry also requires the permanent key from the registrant to perform the lock/unlock operation. The registrar does not have knowledge of the registrant's permanent key. On the other hand, if the permanent domain lock/unlock key held by registrant is compromised, authentication of the registrant by the registrar may protect the domain name from unauthorized lock/unlock operations.

Accordingly, particular embodiments provide enhanced security to lock/unlock operations. The additional security provides a competitive advantage for a registrar.

Particular embodiments are beneficial for a thin registry because of the minimal and anonymous contact between the registrant and the registry. Unlike prior proposed solutions, the registry need not know the identity of the registrant.

Particular embodiments are flexible and scalable because the key generation can be automatic. Interaction between the registrant and the registry for lock/unlock operations may be automatic, manual, or a combination of both. The registry API for interacting with the registrar and the UI for interacting with the registrant may be added to an existing registry with minimal impact (e.g., no changes to EPP needed).

Figure 3:
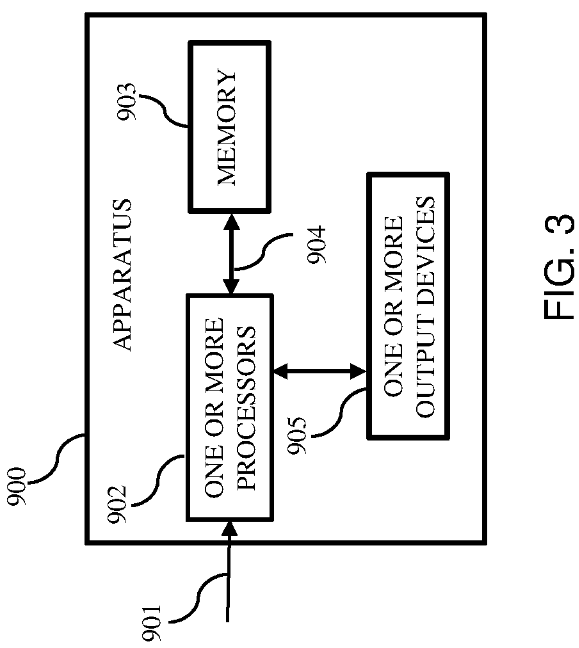
FIG. 3 illustrates an example of an apparatus to implement one or more example embodiments discussed herein.

The registry may be implemented on one or more servers, such as the apparatus described with respect to FIG. 3. Similarly, some or all of the functions performed by the registrar may be performed by one or more servers, such as the apparatus described with respect to FIG. 3.

FIG. 3 illustrates an example of an apparatus to implement one or more example embodiments discussed herein. In this example, the apparatus 900 may include one or more processors 902, one or more output devices 905, and a memory 903. Apparatus 900 may be a computer.

In one embodiment, the one or more processors 902 may include a general purpose processor, an integrated circuit, a server, other programmable logic device, or any combination thereof. The processor may be a conventional processor, microprocessor, controller, microcontroller, or state machine. The one or more processors may be one, two, or more processors of the same or different types. Furthermore, the one or more processors may be a computer, computing device and user device, and the like.

In one example, based on user input 901 and/or other input from a computer network, the one or more processors 902 may execute instructions stored in memory 903 to perform one or more exemplary embodiments described herein. Output produced by the one or more processors 902 executing the instructions may be output on the one or more output devices 905 and/or output to the computer network. The memory 903 may be accessible by the one or more processors 902 via the link 904 so that the one or more processors 902 can read information from and write information to the memory 903. Memory 903 may be integral with or separate from the processors. Examples of the memory 903 include RAM, flash, ROM, EPROM, EEPROM, registers, disk storage, or any other form of storage medium. The memory 903 may store instructions that, when executed by the one or more processors 902, implement one or more embodiments of the invention.

Memory 903 may be a non-transitory computer-readable medium that stores instructions, which when executed by a computer, cause the computer to perform one or more of the exemplary methods discussed herein.

Use of language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

Numerous modifications, alterations, and changes to the described embodiments are possible without departing from the scope of the present invention defined in the claims. It is intended that the present invention is not limited to the described embodiments, but that it has the full scope defined by the language of the following claims, and equivalents thereof.

What is claimed is:

1. A computer-implemented method performed by a domain name registry comprising one or more processors and memory accessible by the one or more processors, the memory storing instructions that when executed by the one or more processors cause the domain name registry to perform the method, the method comprising:

receiving, via a first communication channel, a request from a registrar for a temporary key associated with a domain name;

transmitting the temporary key to the registrar, wherein the temporary key is associated with the domain name;

receiving, via a second communications channel, the temporary key;

transmitting, via the second communications channel, a permanent key for retrieval by a registrant of the domain name;

receiving, via the second communications channel, a request from the registrant of the domain name, wherein the request from the registrant of the domain name comprises the permanent key; and based on receiving the request from the registrant of the domain name, performing a registry lock operation associated with the domain name.

2. The computer-implemented method of claim 1, wherein the request from the registrar for the temporary key comprises an indication of the domain name.

3. The computer-implemented method of claim 1, wherein the second communications channel is a secure channel between the domain name registry and the registrant of the domain name, wherein the second communications channel is secure from the registrar.

4. The computer-implemented method of claim 3, further comprising receiving, via the second communications channel, an indication of the domain name associated with the temporary key.

5. The computer-implemented method of claim 1, further comprising:

receiving, via the first communication channel, a first request from the registrar for the registry lock operation associated with the domain name;

wherein receiving the request from the registrant of the domain name comprises:

receiving, via the second communications channel, a second request for the registry lock operation associated with the domain name, wherein the second request comprises the permanent key; and validating the registry lock operation based on both the first request and the second request; and wherein the registry lock operation is performed after validating the registry lock operation, and wherein the registry lock operation comprises updating one or more records associated with the domain name.

6. The computer-implemented method of claim 5, wherein the first request comprises an indication of the domain name.

7. The computer-implemented method of claim 5, wherein validating the registry lock operation comprises validating the first request, the permanent key, and the domain name.

8. The computer-implemented method of claim 1, wherein receiving, via the second communications channel, the temporary key comprises:

receiving, via the second communications channel, a request from the registrant of the domain name for the permanent key, wherein the request from the registrant of the domain name includes the temporary key.

9. An apparatus to register domain names, comprising at least one processor and memory accessible by the at least one processor, the memory storing instructions executable by the at least one processor, the instructions when executed by the at least one processor causing the apparatus to:

receive a request from a registrar to register a domain name and for a temporary key associated with the domain name;

register the domain name;

generate the temporary key for the domain name;

provide, via an in-band channel, the temporary key;

receive, via an out-of-band channel, the temporary key;

generate a permanent key based on the temporary key;

provide, via the out-of-band channel, the permanent key;

receive, via the out-of-band channel, a request from a registrant of the domain name, wherein the request from the registrant of the domain name comprises the permanent key; and based on receiving the request from the registrant of the domain name, perform a registry lock operation associated with the domain name.

10. The apparatus of claim 9, the instructions, when executed, further causing the apparatus to:

receive, via the in-band channel, a first request to lock or unlock data associated with the domain name, wherein the first request does not include the permanent key;

receive, via the out-of-band channel, a second request to lock or unlock the data associated with the domain name, wherein the second request includes the permanent key, wherein the out-of-band channel is different than the in-band channel;

determine whether a lock or unlock operation for the domain name is authorized based on both the first request and the second request; and upon determining that the lock or unlock operation for the domain name is authorized, perform the lock or unlock operation on at least one record of the domain name.

11. The apparatus of claim 10, the instructions, when executed, further causing the apparatus to:

upon determining that the lock or unlock operation for the domain name is not authorized, notify at least one or both of the registrar or the registrant of the domain name.

12. An apparatus to register domain names, comprising at least one processor and memory accessible by the at least one processor, the memory storing instructions executable by the at least one processor, the executed instructions when executed by the at least one processor implementing:

a shared registry system configured to store information associated with a plurality of domain name registrations;

a registry lock/unlock engine configured to interact with the shared registry system, to:

provide, in response to a request from a registrar, a temporary key for a registered domain name, wherein the temporary key is configured for provisioning a permanent key for the registered domain name, and authorize a registry lock operation based on validation of a request from a registrant of the registered domain name comprising the permanent key; and a registry lock/unlock user interface configured to interact with the registry lock/unlock engine, wherein the registry lock/unlock user interface is configured to provide the permanent key for the registered domain name based on the temporary key received by the registry lock/unlock user interface.

13. The apparatus of claim 12, wherein the registry lock/unlock engine is configured to receive a first request to lock or unlock data associated with the registered domain name, wherein the first request does not include the permanent key associated with the registered domain name, wherein the registry lock/unlock user interface is configured to receive a second request to lock or unlock the data associated with the registered domain name, wherein the second request includes the permanent key associated with the registered domain name.

14. The apparatus of claim 13, wherein the registry lock/unlock engine is configured to authorize a registry lock/unlock operation based on the first request and the permanent key associated with the registered domain name, and wherein, when the registry lock/unlock operation is authorized, the registry lock/unlock engine is configured to perform the registry lock/unlock operation on at least one record of the registered domain name based on the first request and the second request.

15. A non-transitory computer-readable medium of a domain name registry, the computer-readable medium comprising instructions, the instructions when executed by a computer cause the computer to perform a method comprising:

receiving a request from a registrar for a temporary key associated with a domain name;

generating the temporary key for the domain name;

transmitting the temporary key to the registrar;

receiving a request from a registrant for a permanent key based on the temporary key;

generating a permanent key based on the temporary key;

transmitting the permanent key to the registrant, wherein the transmitting the permanent key to the registrant comprises securing the permanent key from the registrar;

receiving a request from the registrant, wherein the request from the registrant comprises the permanent key; and based on receiving the request from the registrant, performing a registry lock operation associated with the domain name.

* * * * *